United States Patent
Koizumi

(10) Patent No.: US 10,218,894 B2
(45) Date of Patent: Feb. 26, 2019

(54) IMAGE CAPTURING APPARATUS, IMAGE CAPTURING METHOD, AND STORAGE MEDIUM

(71) Applicant: CANON KABUSHIKI KAISHA, Tokyo (JP)

(72) Inventor: Risa Koizumi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/480,502

(22) Filed: Apr. 6, 2017

(65) Prior Publication Data
US 2017/0295313 A1    Oct. 12, 2017

(30) Foreign Application Priority Data
Apr. 12, 2016   (JP) ................. 2016-079735

(51) Int. Cl.
| | |
|---|---|
| H04N 5/217 | (2011.01) |
| H04N 5/232 | (2006.01) |
| H04N 5/235 | (2006.01) |
| H04N 5/378 | (2011.01) |

(52) U.S. Cl.
CPC ....... *H04N 5/23212* (2013.01); *H04N 5/2173* (2013.01); *H04N 5/2352* (2013.01); *H04N 5/2353* (2013.01); *H04N 5/23245* (2013.01); *H04N 5/378* (2013.01)

(58) Field of Classification Search
CPC ............. H04N 5/2173; H04N 5/32312; H04N 5/23245; H04N 5/2353; H04N 5/2352; H04N 5/378; H04N 5/23212

USPC .......... 348/345, 208.12, 396, 346, 348, 349, 348/352, 229.1, 220.1, 221.1, 362, 348/231.99, 199, 252, 273, 241; 396/121; 359/625

See application file for complete search history.

(56) References Cited

U.S. PATENT DOCUMENTS

| | | | |
|---|---|---|---|
| 6,243,531 B1* | 6/2001 | Takeuchi ........... | H04N 5/78266 386/224 |
| 6,781,632 B1* | 8/2004 | Ide ......................... | G03B 13/00 250/201.2 |
| 6,933,978 B1* | 8/2005 | Suda ....................... | G02B 7/34 348/345 |

(Continued)

FOREIGN PATENT DOCUMENTS

| | | |
|---|---|---|
| EP | 1085751 A2 | 3/2001 |
| JP | 2001-083407 A | 3/2001 |
| JP | 2012-155095 A | 8/2012 |

*Primary Examiner* — Marly S Camargo
(74) *Attorney, Agent, or Firm* — Venable LLP

(57) ABSTRACT

There is provided an image capturing apparatus. An image capturing unit acquires a signal in a first acquisition mode or a second acquisition mode for each pixel of an image sensor. In the first acquisition mode, an image signal obtained by adding focus detection signals of a plurality of photoelectric conversion units of the pixel is acquired. In the second acquisition mode, the focus detection signals are acquired in addition to the image signal. The image capturing alternately captures a recording image and a focus detection image having a smaller number of pixels than the recording image, applies all pixels to the first acquisition mode when capturing the recording image, and applies at least a part of the pixels to the second acquisition mode when capturing the focus detection image.

21 Claims, 8 Drawing Sheets

(56) References Cited

U.S. PATENT DOCUMENTS

| | | | |
|---|---|---|---|
| 8,149,324 B2* | 4/2012 | Oikawa | H04N 5/23212 250/231.16 |
| 8,830,354 B2 | 9/2014 | Nakaoka | |
| 9,538,110 B2* | 1/2017 | Ikeda | H04N 5/347 |
| 2003/0118329 A1* | 6/2003 | Obrador | G06F 17/30852 386/333 |
| 2007/0206940 A1* | 9/2007 | Kusaka | G03B 13/28 396/128 |
| 2014/0176785 A1* | 6/2014 | Sambonsugi | H04N 5/23212 348/350 |
| 2015/0244931 A1* | 8/2015 | Techikawa | H04N 5/23222 348/239 |
| 2016/0344933 A1* | 11/2016 | Mukai | H04N 5/23245 348/221.1 |
| 2017/0374272 A1* | 12/2017 | Tsuji | G06T 7/11 |

* cited by examiner

| ISO | 100 | 200 | 400 | 800 | 1600 | 3200 | 6400 | 12800 |
|---|---|---|---|---|---|---|---|---|
| IMAGE CAPTURING SEQUENCE | A | A | A | B1 | B1 | B2 | B2 | B2 |

A: IMAGE CAPTURING SEQUENCE A
B1: IMAGE CAPTURING SEQUENCE B
 (X/Y SCHEME FOR CAPTURING LIVE DISPLAY STILL IMAGE)
B2: IMAGE CAPTURING SEQUENCE B
 (Y SCHEME FOR CAPTURING LIVE DISPLAY STILL IMAGE)

FIG. 12

| TEMPERATURE/ ISO | 100 | 200 | 400 | 800 | 1600 | 3200 | 6400 | 12800 |
|---|---|---|---|---|---|---|---|---|
| 30 | | | | | | | | B2 |
| 35 | | | | | | | | B2 |
| 40 | | | | | | B2 | B2 | B2 | B2 |
| 45 | | | B1 | B1 | B2 | B2 | B2 | B2 |
| 50 | A | A | B1 | B1 | B2 | B2 | B2 | B2 |
| 55 | A | A | B1 | B1 | B2 | B2 | B2 | B2 |
| 60 | A | A | B1 | B1 | B2 | B2 | B2 | B2 |

A: IMAGE CAPTURING SEQUENCE A
B1: IMAGE CAPTURING SEQUENCE B
  (X/Y SCHEME FOR CAPTURING LIVE DISPLAY STILL IMAGE)
B2: IMAGE CAPTURING SEQUENCE B
  (Y SCHEME FOR CAPTURING LIVE DISPLAY STILL IMAGE)

FIG. 13

| TEMPERATURE/ EXPOSURE TIME | 1/1000 | 1/250 | 1/60 | 1/15 | 1/4 | 1 | 15 | 30 |
|---|---|---|---|---|---|---|---|---|
| 30 | A | A | A | A | A | A | A | A |
| 35 | A | A | A | A | A | A | A | A |
| 40 | A | A | A | A | A | A | A | A |
| 45 | A | A | B1 | B1 | B1 | B1 | B1 | B1 |
| 50 | A | A | B1 | B1 | B1 | B1 | B2 | B2 |
| 55 | A | A | B1 | B1 | B1 | B2 | B2 | B2 |
| 60 | A | B1 | B1 | B1 | B2 | B2 | B2 | B2 |

A: IMAGE CAPTURING SEQUENCE A
B1: IMAGE CAPTURING SEQUENCE B
  (X/Y SCHEME FOR CAPTURING LIVE DISPLAY STILL IMAGE)
B2: IMAGE CAPTURING SEQUENCE B
  (Y SCHEME FOR CAPTURING LIVE DISPLAY STILL IMAGE)

IMAGE CAPTURING APPARATUS, IMAGE CAPTURING METHOD, AND STORAGE MEDIUM

BACKGROUND OF THE INVENTION

Field of the Invention

The present invention relates to an image capturing apparatus, an image capturing method, and a storage medium.

Description of the Related Art

Conventionally, a technique is known that implements the acquisition of a focus detection signal and the acquisition of an image signal by using one image sensor. For example, a technique has been proposed in which a pixel that acquires a focus detection signal serves also as a pixel for acquiring a displaying/recording image signal (see Japanese Patent Laid-Open No. 2001-083407). According to this technique, at least some of the pixels constituting an image sensor are divided into a plurality of regions in at least one of a horizontal direction and a vertical direction. At the time of image acquisition, an image signal can be obtained by adding signals obtained from the regions obtained by division. Also, at the time of focus adjustment, a phase difference focus detection signal in which each pixel is pupil-divided can be obtained by performing read-out so as to obtain signals corresponding to two regions obtained by division in the horizontal direction or the vertical direction.

Japanese Patent Laid-Open No. 2012-155095 discloses an image capturing apparatus in which signals of a plurality of regions obtained by division are read into a line memory, and switching is performed between the following actions: adding the signals on a pixel-by-pixel basis so as to output the resulting signal as an image signal; and independently outputting the signal corresponding to each region so as to use the signal as a phase difference focus detection signal.

Here, consideration is given to processing in which continuous image capturing with autofocus (AF) tracking is performed by using an image sensor as disclosed in Japanese Patent Laid-Open No. 2012-155095 that has a pupil division readout function and in which each pixel is composed of a plurality of photoelectric conversion units. A focus detection signal can be obtained by performing read-out so as to obtain signals corresponding to two regions obtained by dividing each pixel in the horizontal direction or the vertical direction, and it is therefore possible to acquire both of a focus detection signal and an image signal by capturing one frame. That is, continuous image capturing can be implemented by repeating exposure, acquisition of a focus detection signal and an image signal, and focus adjustment.

However, a larger noise is generated in the configuration in which both of a focus detection signal and an image signal are acquired from the same pixel than in a configuration in which only an image signal is acquired. Also, in the case of a configuration in which pixels that acquire both of a focus detection signal and an image signal and pixels that acquire only an image signal are present in a mixed state such as a configuration in which only a partial region of the angle of view is used as a focus detection region, the noise level varies from region to region in a captured image, which may deteriorate the image quality. This problem is particularly pronounced when image capturing is performed under an image capturing condition in which a large noise is generated, such as at the time of image capturing with a high sensitivity.

In addition, the time required to capture a recording still image is relatively long, and thus if focus control for performing second image capturing is performed based on a focus detection signal acquired by performing first image capturing, the focus cannot follow a fast moving subject, which may cause deterioration of image quality.

SUMMARY OF THE INVENTION

The present invention has been made under the circumstances described above, and the present invention provides a technique for suppressing deterioration of image quality when continuous image capturing is performed by using an image sensor that can acquire both of a focus detection signal and an image signal from the same pixel.

According to a first aspect of the present invention, there is provided an image capturing apparatus comprising: an image sensor including a plurality of pixels, each pixel including a plurality of photoelectric conversion units that generate focus detection signals from light flux that have passed through different regions in an exit pupil in an optical system; and an image capturing unit configured to continuously capture a plurality of images by using the image sensor, the image capturing unit being configured to acquire a signal in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal, wherein the image capturing unit is configured to alternately capture a recording image and a focus detection image having a smaller number of pixels than the recording image, apply all pixels to the first acquisition mode when capturing the recording image, and apply at least a part of the pixels to the second acquisition mode when capturing the focus detection image.

According to a second aspect of the present invention, there is provided an image capturing apparatus comprising: an image sensor configured to output an image signal for generating an image and a focus detection signal for performing focus detection; and a control unit configured to control a number of pixels used to output the image signal and the focus detection signal from the image sensor and a predetermined region for outputting the focus detection signal in the image sensor, wherein the control unit is configured to, when successively acquiring frames from the image sensor, control the number of pixels used to output the image signal and the focus detection signal from the image sensor in a frame acquired between the successively acquired frames, based on an image capturing condition.

According to a third aspect of the present invention, there is provided an image capturing method for an image capturing apparatus comprising an image sensor including a plurality of pixels, each pixel including a plurality of photoelectric conversion units that generate focus detection signals from light flux that have passed through different regions in an exit pupil in an optical system, the method comprising: continuously capturing a plurality of images by using the image sensor, wherein a signal is acquired in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal, wherein a recording image and a focus detection image having a smaller number of pixels than the recording image are alternately captured, all pixels are applied to the first acquisition mode when capturing the recording image, and at least a part of the pixels are applied to the second acquisition mode when capturing the focus detection image.

According to a fourth aspect of the present invention, there is provided an image capturing method for an image capturing apparatus comprising an image sensor configured to output an image signal for generating an image and a focus detection signal for performing focus detection, the method comprising: controlling a number of pixels used to output the image signal and the focus detection signal from the image sensor and a predetermined region for outputting the focus detection signal in the image sensor, wherein, when frames are successively acquired from the image sensor, the number of pixels used to output the image signal and the focus detection signal from the image sensor in a frame acquired between the successively acquired frames is controlled based on an image capturing condition.

According to a fifth aspect of the present invention, there is provided a non-transitory computer-readable storage medium which stores a program for causing a computer to execute an image capturing method for an image capturing apparatus comprising an image sensor including a plurality of pixels, each pixel including a plurality of photoelectric conversion units that generate focus detection signals from light flux that have passed through different regions in an exit pupil in an optical system, the method comprising: continuously capturing a plurality of images by using the image sensor, wherein a signal is acquired in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal, wherein a recording image and a focus detection image having a smaller number of pixels than the recording image are alternately captured, all pixels are applied to the first acquisition mode when capturing the recording image, and at least a part of the pixels are applied to the second acquisition mode when capturing the focus detection image.

According to a sixth aspect of the present invention, there is provided a non-transitory computer-readable storage medium which stores a program for causing a computer to execute an image capturing method for an image capturing apparatus comprising an image sensor configured to output an image signal for generating an image and a focus detection signal for performing focus detection, the method comprising: controlling a number of pixels used to output the image signal and the focus detection signal from the image sensor and a predetermined region for outputting the focus detection signal in the image sensor, wherein, when frames are successively acquired from the image sensor, the number of pixels used to output the image signal and the focus detection signal from the image sensor in a frame acquired between the successively acquired frames is controlled based on an image capturing condition.

Further features of the present invention will become apparent from the following description of exemplary embodiments with reference to the attached drawings.

BRIEF DESCRIPTION OF THE DRAWINGS

FIG. 12 is a diagram showing an example of selecting an image capturing sequence based on whether or not to execute black subtraction processing, sensitivity and temperature.

FIG. 13 is a diagram showing an example of selecting an image capturing sequence based on exposure time and temperature.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
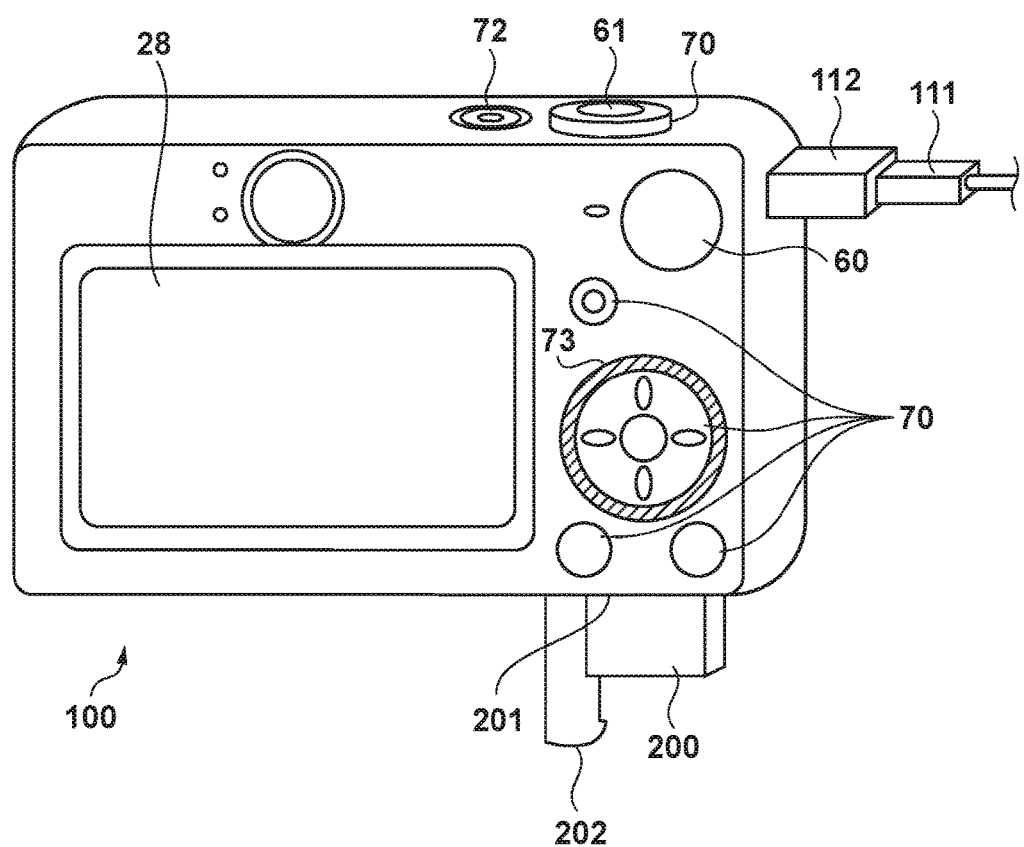
FIG. 1 is an external view of an image capturing apparatus 100.

FIG. 1 is an external view of an image capturing apparatus 100 according to a first embodiment. In FIG. 1, a display unit 28 displays images, various types of information, and so on. A shutter button 61 is an operation unit for making a shooting instruction. A mode change switch 60 is an operation unit for switching among various types of modes. A connector 112 connects a connection cable 111 and the image capturing apparatus 100. An operation unit 70 is constituted by operation members such as various types of switches, buttons, a touch panel, and so on that accept various types of operations from a user. A controller wheel 73 is an operation member, included in the operation unit 70, that can be rotationally manipulated. A power switch 72 is an operation unit for switching the power on and off. A recording medium 200 is a recording medium such as a memory card, a hard disk, or the like. A recording medium slot 201 is a slot for holding the recording medium 200. The recording medium 200 held in the recording medium slot 201 can communicate with the image capturing apparatus 100.

Figure 2:
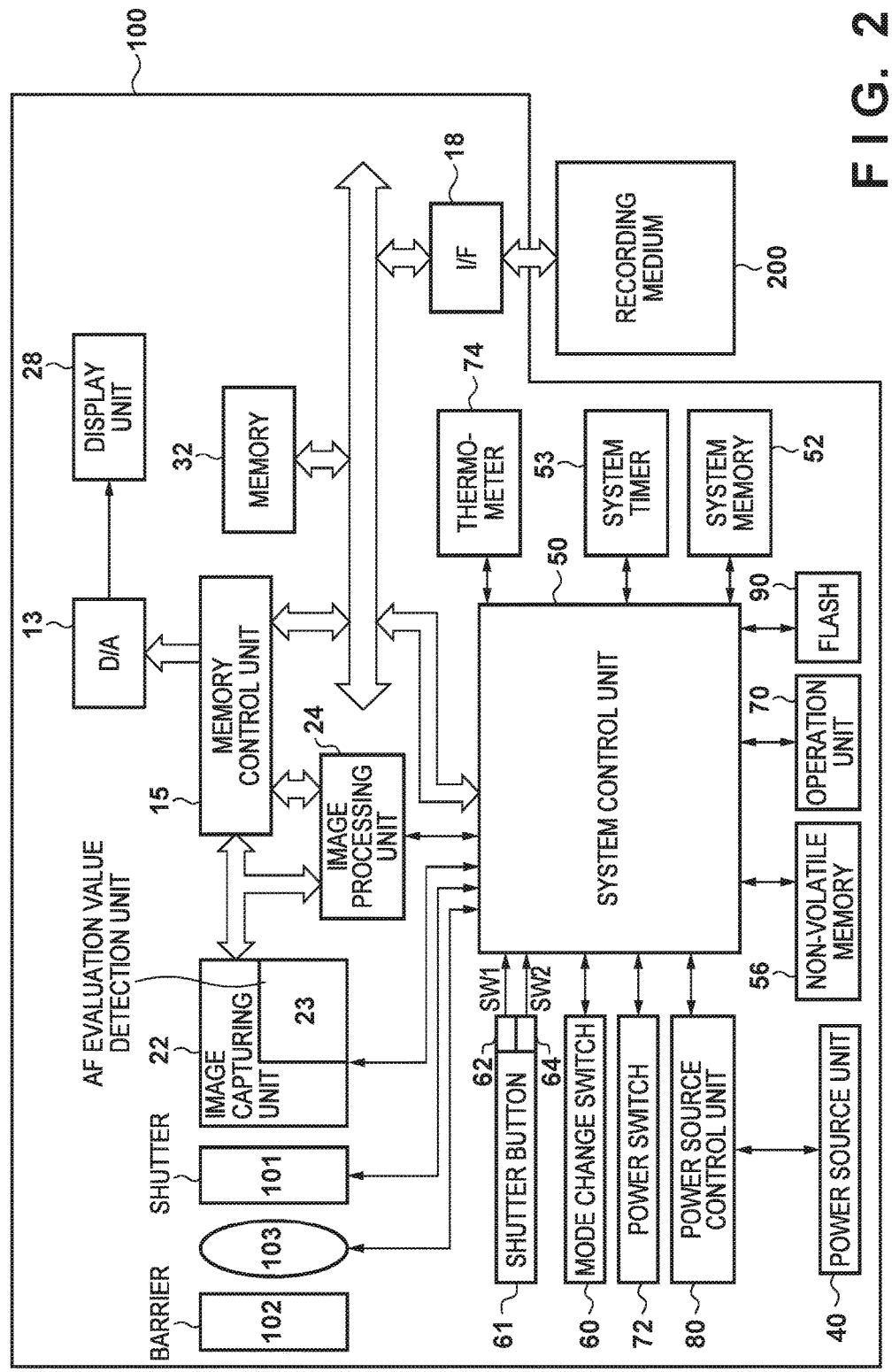
FIG. 2 is a functional block diagram of the image capturing apparatus 100.

FIG. 2 is a functional block diagram of the image capturing apparatus 100. In FIG. 2, a shutter 101 is a shutter having an aperture function. A shooting lens 103 corresponds to a lens group including a zoom lens and a focus lens. An image capturing unit 22 is an image sensor constituted by a CCD, a CMOS element, or the like that converts an optical image into an electrical signal. The image capturing unit 22 includes an A/D conversion processing function. An AF evaluation value detection unit 23 calculates an AF (autofocus) evaluation value from contrast information and the like obtained from a digital image signal, and the obtained AF evaluation value is output from the image capturing unit 22 to a system control unit 50. A barrier 102 prevents an imaging system including the shooting lens 103, the shutter 101, and the image capturing unit 22 from being soiled or damaged by covering the imaging system. A flash 90 adds illumination light when shooting low-light scenes, backlit scenes, or the like by emitting light during the shooting.

An image processing unit 24 carries out predetermined pixel interpolation, resizing processes for reducing the size of an image and the like, color conversion processing, and so on, on image data output from the image capturing unit 22 or image data from a memory control unit 15. The image processing unit 24 also performs predetermined computational processing using captured image data, and the system control unit 50 performs exposure control and focus control based on results obtained from these computations. A TTL (through-the-lens) AE (automatic exposure) process and an EF (automatic flash adjustment) process are implemented thereby. The image processing unit 24 also carries out an AF (autofocus) process, but at this time, the output from the AF evaluation value detection unit 23 in the image capturing unit 22 is also sometimes used. The image processing unit 24 also performs predetermined computations using the captured image data, performing a TTL AWB (auto white balance) process based on the results thereof.

Data output from the image capturing unit 22 is written directly into a memory 32 via the image processing unit 24 and the memory control unit 15, or via the memory control unit 15. The memory 32 stores the image data obtained by the image capturing unit 22 and subjected to A/D conversion, image data for display in the display unit 28, and the like. The memory 32 is provided with a storage capacity sufficient to store a predetermined number of still images, a predetermined time's worth of moving images and audio, and so on. The memory 32 also functions as an image display memory (a video memory).

A D/A converter 13 converts data for image display, stored in the memory 32, into an analog signal and supplies the analog signal to the display unit 28. In this manner, image data for display written into the memory 32 is displayed by the display unit 28 via the D/A converter 13. The display unit 28 carries out a display in a display device, which is an LCD or the like, based on the analog signal from the D/A converter 13. By using the D/A converter 13 to convert the digital signals A/D converted by the image capturing unit 22 and stored in the memory 32 into analog signals and then sequentially transferring and displaying those signals to the display unit 28, the display unit 28 functions as an electronic viewfinder and displays a through-the-lens image.

A non-volatile memory 56 is a memory that can be recorded to and erased electrically, and is constituted by, for example, a flash memory. Operational constants, programs, and so on of the system control unit 50 are stored in the non-volatile memory 56. Here, "programs" refers to programs for executing the various flowcharts according to the present embodiment, which will be described later.

The system control unit 50 controls the image capturing apparatus 100 as a whole. The system control unit 50 implements the respective processes according to the present embodiment, mentioned later, by executing programs recorded in the non-volatile memory 56 mentioned above. The system control unit 50 also carries out display control by controlling the memory 32, the D/A converter 13, the display unit 28, and so on. A system memory 52 is a RAM. Operational constants and variables of the system control unit 50, programs read out from the non-volatile memory 56, and so on are loaded into the system memory 52. A system timer 53 measures times used in various types of control, measures the time of an internal clock, and so on.

The mode change switch 60, a first shutter switch 62, a second shutter switch 64, and the operation unit 70 are operation members for inputting various types of operating instructions to the system control unit 50. The mode change switch 60 switches an operating mode of the system control unit 50 among a still image shooting mode, a moving image shooting mode, a playback mode, and so on. "Still image shooting mode" includes an auto shooting mode, an auto scene judgment mode, a manual mode, various types of scene modes having shooting settings for each type of shot scene, a program AE mode, a custom mode, and so on. The mode change switch 60 can switch the operating mode directly to one of these modes included in the still image shooting mode. Alternatively, the mode switch may be carried out by first switching to the still image shooting mode using the mode change switch 60 and them using another operation member to switch to one of the modes included in the still image shooting mode. Likewise, the moving image shooting mode may also include a plurality of modes. The first shutter switch 62 switches on partway through the manipulation of the shutter button 61 provided in the image capturing apparatus 100, or in other words, when the button is depressed halfway (a shooting preparation instruction), and produces a first shutter switch signal SW1. The system control unit 50 commences operations such as AF (autofocus) processes, AE (automatic exposure) processes, AWB (auto white balance) processes, and EF (automatic flash adjustment) processes in response to the first shutter switch signal SW1. The second shutter switch 64 turns on when the shutter button 61 is completely manipulated, or in other words, is fully depressed (a shooting instruction), and produces a second shutter switch signal SW2. The system control unit 50 commences a series of shooting processes, from reading out signals from the image capturing unit 22 to writing image data into the recording medium 200, in response to the second shutter switch signal SW2.

Functions relevant for different situations are assigned to the operation members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. A user can make various types of settings intuitively using the menu screen displayed in the display unit 28, four directional (up, down, left, and right) buttons, a set button, and so on.

The controller wheel 73 illustrated in FIG. 1 is an operation member, included in the operation unit 70, that can be rotationally manipulated, and is used along with the directional buttons when specifying items to be selected and so on. When the controller wheel 73 is rotationally manipulated, an electrical pulse signal is produced in accordance with the operational amount, and the system control unit 50 controls the respective units in the image capturing apparatus 100 based on that pulse signal. An angle to which the controller wheel 73 has been rotationally manipulated, a number of revolutions, and so on can be determined based on this pulse signal. Note that the controller wheel 73 may be any kind of operation member as long as the member is capable of detecting rotational manipulation. For example, the controller wheel 73 may be a dial-type operation member that produces a pulse signal upon the controller wheel 73 itself rotating in accordance with a rotational manipulation made by a user. Alternatively, the controller wheel 73 may be an operation member constituted by a touch sensor, with the controller wheel 73 detecting rotational motion of a user's finger on the controller wheel 73 rather than the controller wheel 73 itself rotating (a so-called "touch wheel").

A thermometer 74 measures temperature of the image capturing apparatus 100. A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200.

A power source unit 40 is a primary battery such as an alkali battery, a lithium battery, or the like, a secondary battery such as a NiCd battery, a NiMH battery, a Li battery, or the like, an AC adapter, and so on. A recording medium I/F 18 is an interface for the recording medium 200 such as a memory card, a hard disk, or the like. The recording medium 200 is a recording medium for recording shot images, such as a memory card or the like, and is constituted by a semiconductor memory, a magnetic disk, or the like.

Figure 3:
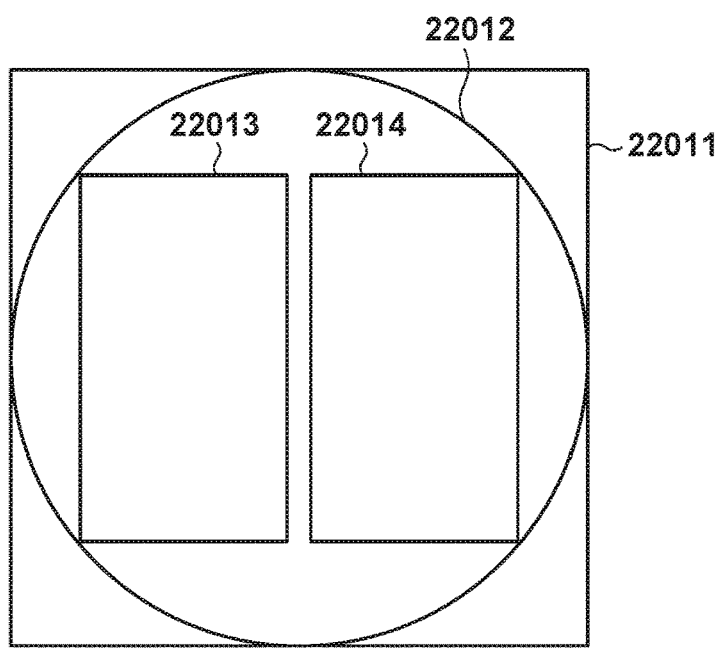
FIG. 3 is a diagram schematically showing a configuration of one pixel included in an image capturing unit 22.

FIG. 3 is a diagram schematically showing a configuration of one pixel included in the image capturing unit 22. A pixel 22011 includes a microlens 22012. Also, the pixel 22011 includes photodiodes (PD) that serve as a plurality of photoelectric conversion units. In the example shown in FIG. 2, two PDs (PD 22013 and PD 22014) are illustrated, but there is no limitation on the number of photodiodes as long as two or more photodiodes are provided.

Figure 4:
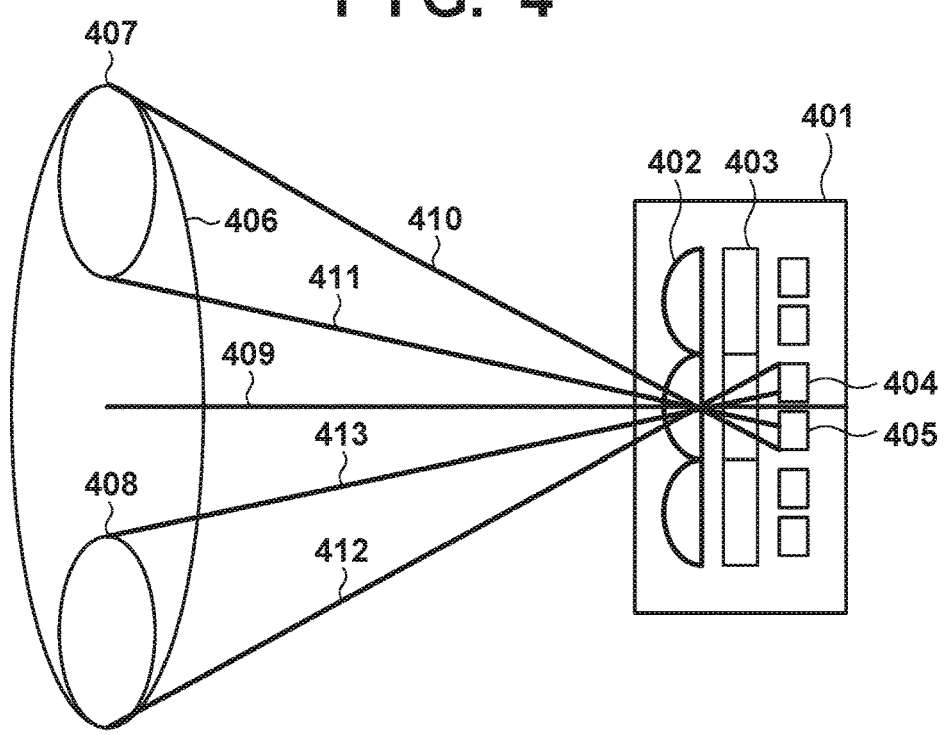
FIG. 4 is a diagram conceptually showing that light flux that have passed through an exit pupil of a shooting lens 103 (optical system) are incident on the image capturing unit 22.

FIG. 4 is a diagram conceptually showing that light flux that have passed through an exit pupil of the shooting lens 103 (optical system) are incident on the image capturing unit 22. In FIG. 4, reference numeral 401 indicates a cross-section of a pixel array, and the cross-section 401 includes a microlens 402, a color filter 403, a PD 404 and a PD 405. The PD 404 and the PD 405 correspond to the PD 22013 and the PD 22014 shown in FIG. 3. Reference numeral 406 indicates the exit pupil of the shooting lens 103.

Here, the center of a light flux that has passed through the exit pupil 406 and enters a pixel having the microlens 402 is defined as optical axis 409. The light flux that has passed through the exit pupil 406 is incident on the image capturing unit 22, with the light flux having the optical axis 409 at the center. A region 407 and a region 408 are partial regions of the exit pupil 406. Outermost light beams of a light flux that has passed through the region 407 are indicated by reference numerals 410 and 411, and outermost light beams of a light flux that has passed through the region 408 are indicated by reference numerals 412 and 413.

As can be seen from FIG. 4, among the light flux emitted from the exit pupil 406, those located above the optical axis 409 are incident on the PD 405, and those located below the optical axis 409 are incident on the PD 404. That is, the PD 404 and the PD 405 receive light flux that have passed through different regions in the exit pupil 406. Here, the signal received by the PD 404 will be referred to as "image A", the signal received by the PD 405 will be referred to as "image B", and the sum value of image A and image B will be referred to as "image A+B". The image capturing apparatus 100 can acquire distance information by calculating the amount of defocus by acquiring the image A and the image B (focus detection signals) and using these images as a pair of phase difference signals. Also, the image capturing apparatus 100 can generate a still image based on image A+B (image signal) by acquiring the image A+B. The image capturing apparatus 100 can perform signal read-out from each pixel included in the image capturing unit 22 by the following X scheme or Y scheme.

X scheme (first acquisition mode): a read-out scheme for acquiring an image A+B

Y scheme (second acquisition mode): a read-out scheme for acquiring an image A, an image B, and an image A+B In the case of the Y scheme, the image capturing apparatus 100 can generate an image B by, for example, reading out an image A and an image A+B and then performing the following arithmetic calculation: "(image A+B)−(image A)". Alternatively, the image capturing apparatus 100 can generate an image A+B by reading out an image A and an image B and then performing the following arithmetic calculation: "(image A)+(image B)". In the present embodiment, there is no particular limitation on the details of the read-out and the arithmetic calculation as long as an image A, an image B and an image A+B are acquired Next, two image capturing sequences for performing continuous capturing of images that can be executed by the image capturing apparatus 100 will be described with reference to FIGS. 5 to 8. The image capturing apparatus 100 can execute an image capturing sequence A (first continuous image capturing mode) or an image capturing sequence B (second continuous image capturing mode), the image capturing sequence A being a sequence in which only recording still images are successively captured, and the image capturing sequence B being a sequence in which recording still images and live display still images are alternately captured.

Figure 5:
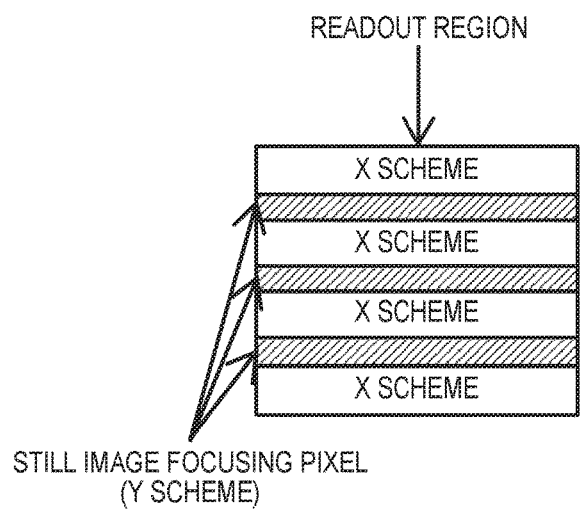
FIG. 5 is a diagram showing a readout region in the image capturing unit 22 in image capturing sequence A.

FIG. 5 is a diagram showing a readout region in the image capturing unit 22 in the image capturing sequence A. As shown in FIG. 5, the image capturing apparatus 100 performs read-out based on the Y scheme with respect to some rows in the readout region (the rows being designated as still image focusing pixels), and performs read-out based on the X scheme with respect to the remaining rows. The read-out scheme as described above in which the X scheme and the Y scheme are used in combination will be referred to as "X/Y scheme". The image capturing apparatus 100 generates a recording still image based on an image A+B acquired from each pixel in the readout region. Also, the image capturing apparatus 100 calculates the amount of defocus based on images A and images B acquired from the pixels applied to the Y scheme. That is, the image capturing apparatus 100 can acquire focus detection signals (phase difference signals) in addition to an image signal for generating a recording still image by performing image capturing in accordance with the scheme shown in FIG. 5.

The image capturing apparatus 100 can also perform read-out based on the Y scheme with respect to all of the pixels in the readout region. However, in this case, it takes time to perform the read-out, as a result of which the speed of continuous image capturing decreases. For this reason, in FIG. 5, the configuration in which the X scheme and the Y scheme are used in combination has been described. However, the present embodiment is not limited to the configuration in which the X scheme and the Y scheme are used in combination. The read-out scheme can be changed in real time, and thus the image capturing apparatus 100 may change the pixels for which read-out is performed based on the Y scheme, according to the subject. It is thereby possible to enhance the accuracy of focusing.

Figure 6:
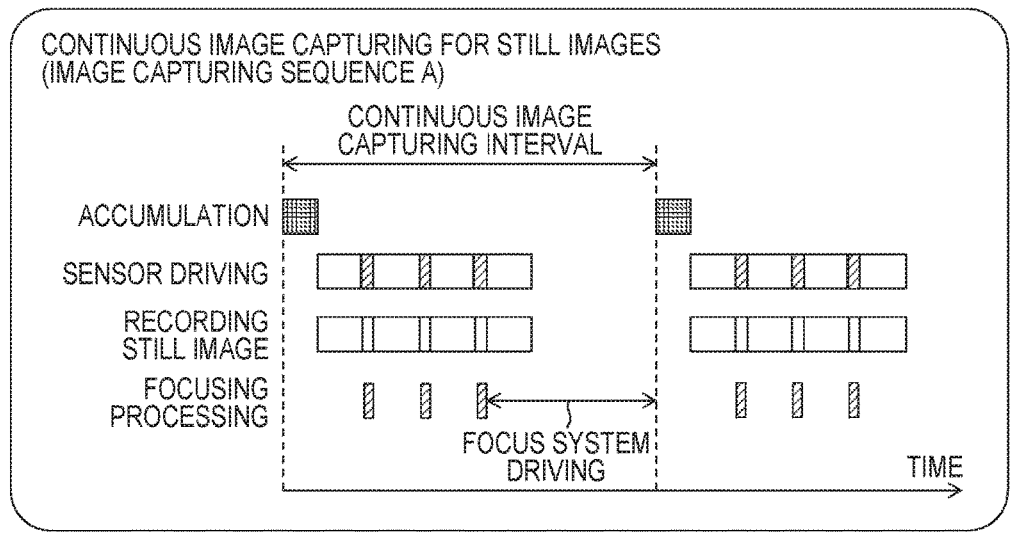
FIG. 6 is a timing chart of image capturing sequence A.

FIG. 6 is a timing chart of the image capturing sequence A. The image capturing apparatus 100 starts read-out of an image capturing signal upon completion of accumulation of electric charges in an amount corresponding to the set exposure time. In the sensor driving shown in FIG. 6, the hatched portions indicate the read-out based on the Y scheme. With respect to the pixels for which read-out is performed based on the Y scheme, the image capturing apparatus 100 uses image A+B (image signal) to generate a recording still image, and uses image A and image B (focus detection signal) to perform focusing processing (to calculate the amount of defocus). The image capturing apparatus 100 drives the focus lens during a period from the completion of the focusing processing to the next timing of image capturing (the timing of start of an exposure period).

Figure 7:
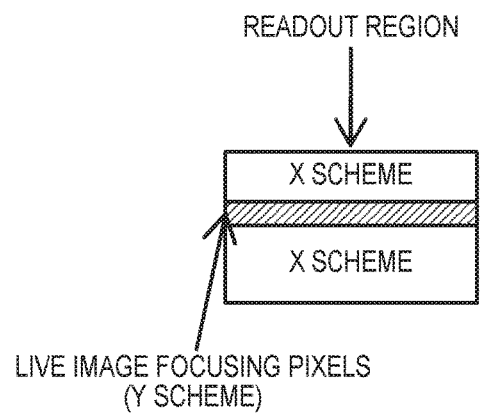
FIG. 7 is a diagram showing a readout region in the image capturing unit 22 for a live display still image (focus detection still image) in image capturing sequence B.

FIG. 7 is a diagram showing a readout region in the image capturing unit 22 for a live display still image (focus detection still image) in the image capturing sequence B. In general, a live display still image has a smaller number of pixels than that of a recording still image, and thus the pixels to be read are thinned out at the time of capturing a live display still image. This thinning-out is conceptually presented by illustrating the readout region shown in FIG. 7 as being smaller than the readout region shown in FIG. 5. However, the size ratio between the two readout regions does not limit the thinning-out rate. As shown in FIG. 7, the image capturing apparatus 100 performs read-out based on the Y scheme with respect to some rows in the readout region (the rows being designated as live image focusing pixels), and performs read-out based on the X scheme with respect to the remaining rows. The system control unit 50 generates a live display still image based on an image A+B acquired from each pixel in the readout region. Also, the image capturing apparatus 100 calculates the amount of defocus based on images A and images B acquired from the pixels applied to the Y scheme. That is, the image capturing apparatus 100 can acquire focus detection signals (phase difference signals) in addition to an image signal for generating a live still image by performing still image capturing in accordance with the scheme shown in FIG. 7.

Figure 8:
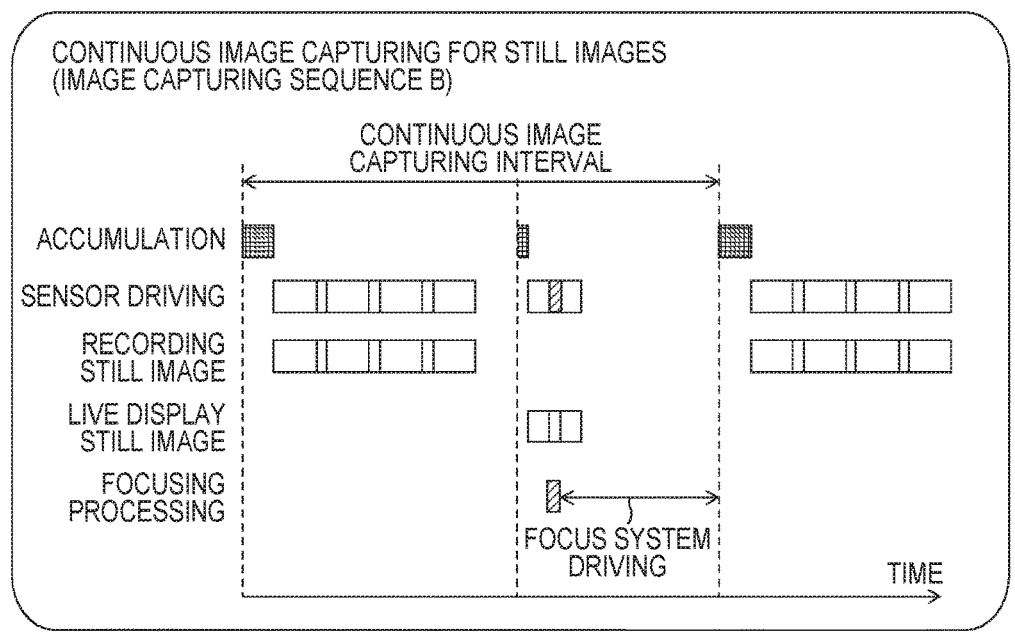
FIG. 8 is a timing chart of image capturing sequence B.

FIG. 8 is a timing chart of the image capturing sequence B. In the sensor driving shown in FIG. 8, the hatched portions indicate the read-out based on the Y scheme. As shown in FIG. 8, a live display still image is captured between two instances of capturing a recording still image, and an image A and an image B for focusing processing are acquired at the time of capturing the live display still image. Also, at the time of capturing a recording still image, read-out is performed based on the X scheme with respect to all pixels in the readout region so as to provide images A+B, and a recording still image is generated from the obtained images A+B. The exposure time for a live display still image is shorter than that for a recording still image.

In the case of the image capturing sequence B, it is necessary to capture a live display still image after a recording still image has been captured, and thus the speed of continuous image capturing drops as compared to that in the image capturing sequence A. Accordingly, in terms of speed of continuous image capturing, the image capturing sequence A is superior to the image capturing sequence B.

However, in terms of image quality, the image capturing sequence B is superior to the image capturing sequence A for the following three reasons.

Firstly, in the case of the image capturing sequence A, a noise level difference occurs in the recording still image, which may cause deterioration of image quality. To be specific, noise increases in the image A+B acquired based on the Y scheme as compared to the image A+B acquired based on the X scheme. For this reason, in the recording still image, a noise level difference occurs in the boundary between the region applied to the X scheme and the region applied to the Y scheme. Particularly in the case of an image capturing condition in which a large noise is generated (for example, in the case where the sensitivity is high), the noise level difference becomes significant, and the image quality may deteriorate significantly. On the other hand, in the case of the image capturing sequence B, only the X scheme is used with respect to the recording still image, and it is therefore possible to prevent deterioration of image quality due to a noise level difference. Although a noise level difference does not occur when all pixels in the readout region are read out based on the Y scheme in the image capturing sequence A, the noise in the entire still image increases. Accordingly, in any case, the image quality of the image capturing sequence A is lower than the image quality of the image capturing sequence B.

Secondly, in the case of the image capturing sequence A, the accumulation of the image A and the image B that is used for focus control is performed by using an aperture value at the time of capturing a recording still image. For this reason, if the aperture value is set to a large value and the depth of field is deep, it may not be possible to appropriately acquire the amount of defocus. As a result, the accuracy of focusing decreases, and the image quality may deteriorate. On the other hand, in the case of the image capturing sequence B, by setting a smaller aperture value at the time of capturing a live display still image, it is possible to establish a shallow depth of field and improve the accuracy of focusing.

Thirdly, in the case of the image capturing sequence A, the length of time between a timing of accumulation of the image A and the image B that is used for focus control and the next timing of accumulation (in other words, the timing of capturing the next recording still image) is relatively long, and thus the focus cannot rapidly follow a moving subject. For this reason, if the subject is moving fast, the accuracy of focusing decreases, which may cause deterioration of image quality. On the other hand, in the case of the image capturing sequence B, as described above, a live display still image has a smaller number of pixels than that of a recording still image, and thus the accumulation and the read-out for a live display still image are performed in a shorter time than the accumulation and the read-out for a recording still image. For this reason, the length of time between a timing of accumulation of the image A and the image B that is used for focus control and a timing of capturing the next recording still image is shorter than that in the image capturing sequence A. Accordingly, the speed at which the focus follows the subject is improved, and the deterioration of image quality is suppressed.

In the image capturing sequence B, live displaying a still image captured between two recording still images is not a requirement. To generalize it, in the image capturing sequence B, a still image (focus detection still image) having a smaller number of pixels than that of a recording still image is captured between two recording still images.

In the present embodiment, at the time of continuous image capturing of still images, the image capturing apparatus 100 selects either the image capturing sequence A or the image capturing sequence B according to the image capturing conditions (for example, sensitivity and aperture value) and the speed of the subject. In the case of the image capturing conditions and the speed of the subject in which a large image quality deterioration is highly likely to occur, the image capturing apparatus 100 selects the image capturing sequence B so as to suppress deterioration of image quality. Conversely, in the case of the image capturing conditions and the speed of the subject in which a large image quality deterioration is less likely to occur, the image capturing apparatus 100 selects the image capturing sequence A so as to improve the speed of continuous image capturing. A specific example of selection criteria will be described later with reference to FIG. 10.

In the present embodiment, the selection of the image capturing sequence is not a requirement, and the image capturing apparatus 100 may constantly execute the image capturing sequence B. In this case, although the speed of continuous image capturing decreases, the deterioration of image quality can be suppressed irrespectively of the image capturing conditions and the speed of the subject. Also, the selection criteria for selection of the image capturing sequence performed by the image capturing apparatus 100 is not limited to the image capturing conditions and the speed of the subject described above. For example, the image capturing apparatus 100 may select the image capturing sequence A or the image capturing sequence B in accordance with an instruction from a user.

Figure 9:
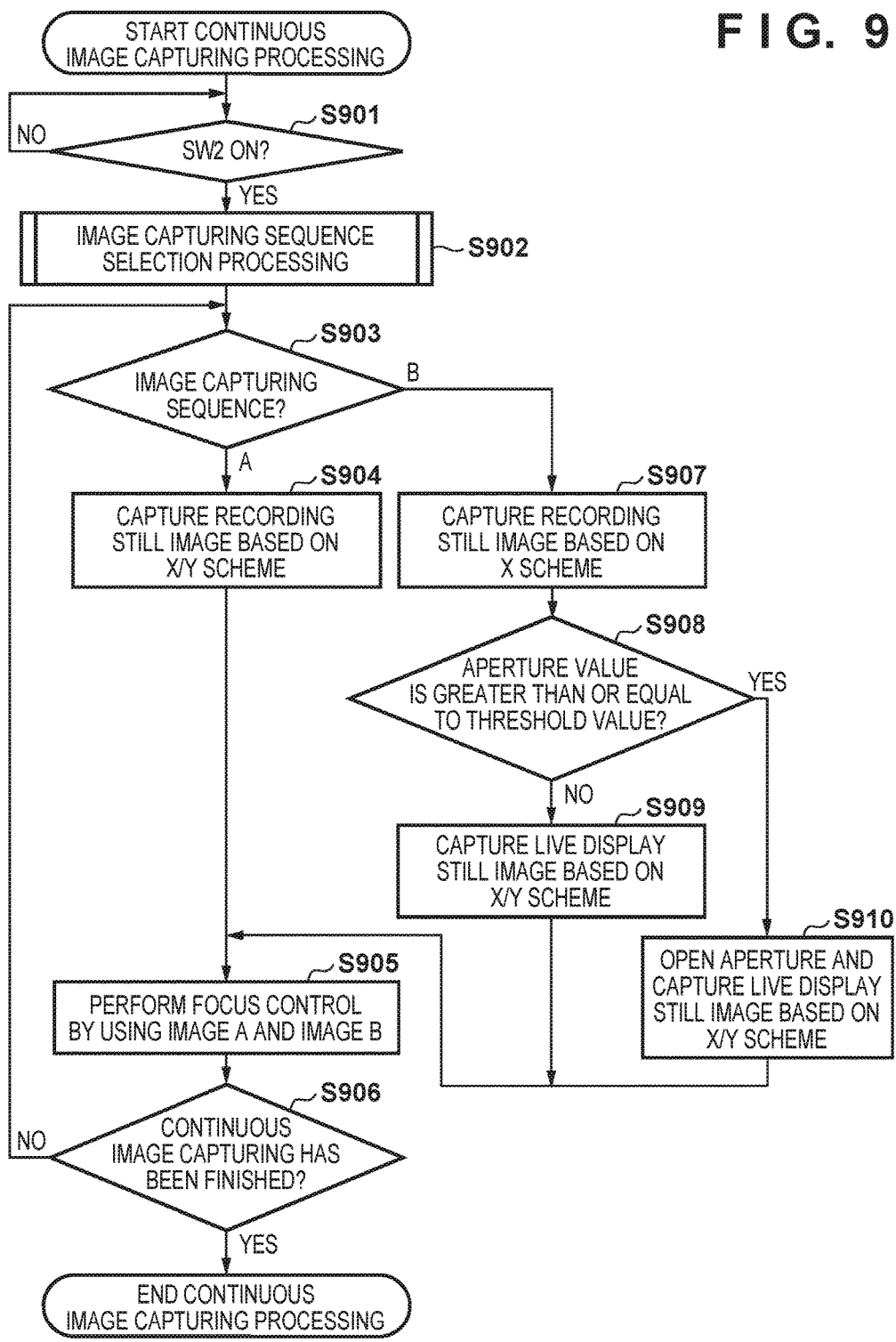
FIG. 9 is a flowchart of continuous image capturing processing performed by the image capturing apparatus 100.

Next, continuous image capturing processing performed by the image capturing apparatus 100 will be described with reference to FIG. 9. Unless otherwise stated, the processing in each step in the flowchart shown in FIG. 9 is implemented by the system control unit 50 executing a program stored in the non-volatile memory 56. The processing of the flowchart starts in response to the user operating the mode change switch 60 to set the image capturing apparatus 100 in the continuous image capturing mode.

In step S901, the system control unit 50 waits for the second shutter switch 64 to be ON. If the second shutter switch 64 is set to ON, the system control unit 50 advances the processing to step S902. In step S902, the system control unit 50 selects the image capturing sequence A or the image capturing sequence B according to the image capturing conditions and the speed of the subject. The selection processing will be described later in detail with reference to FIG. 10. In step S903, the system control unit 50 determines which of the image capturing sequence A and the image capturing sequence B has been selected in step S902. If it is determined that the image capturing sequence A has been selected, the system control unit 50 advances the processing to step S904, and if it is determined that the image capturing sequence B has been selected, the system control unit 50 advances the processing to step S907.

In step S904, the system control unit 50 captures a recording still image based on the X/Y scheme, and records the captured image in the recording medium 200. The specific capturing method is as described above with reference to FIGS. 5 and 6. The system control unit 50 temporarily stores the image A and the image B acquired at the time of image capturing in the memory 32. In step S905, the system control unit 50 performs focus control on the subject by calculating the amount of defocus by using the image A and the image B, and driving the focus lens of the shooting lens 103. In step S906, the system control unit 50 determines whether or not the continuous image capturing has been finished. It is determined that the continuous image capturing has been finished if, for example, a predetermined number of recording still images have been made, or if the second shutter switch 64 is turned off. If it is determined that the continuous image capturing has been finished, the processing of the flowchart ends. Otherwise, the system control unit 50 returns the processing to step S903. In this way, recording still images are continuously captured.

On the other hand, if it is determined in step S902 that the image capturing sequence B has been selected, the system control unit 50 advances the processing from step S903 to step S907. In step S907, the system control unit 50 captures a recording still image based on the X scheme, and records the captured recording still image in the recording medium 200. The specific capturing method is as described above with reference to FIG. 8, and all pixels in the readout region are read out based on the X scheme. In step S908, the system control unit 50 acquires aperture conditions for capturing a recording still image, and determines whether or not the aperture value is greater than or equal to a threshold value.

If it is determined in step S908 that the aperture value is less than the threshold value (if the aperture is close to an open state), the system control unit 50 advances the processing to step S909. In step S909, the system control unit 50 captures a live display still image based on the X/Y scheme, and displays the captured live display still image on the display unit 28. The specific capturing method is as described above with reference to FIGS. 7 and 8. The system control unit 50 temporarily stores the image A and the image B acquired at the time of image capturing in the memory 32. The system control unit 50 may determine the positions and the number of pixels that are to be read out based on the Y scheme according to a criterion (for example, the state of the subject) each time image capturing is performed in step S909. It is thereby possible to further enhance the accuracy of focusing.

If it is determined in step S908 that the aperture value is greater than or equal to the threshold value, the system control unit 50 advances the processing to step S910. In step S910, the system control unit 50 opens the aperture to capture a live display still image based on the X/Y scheme, and displays the captured live display still image on the display unit 28. The image capturing here is performed in the same manner as that performed in step S909. That is, the processing in step S910 is the same as that in step S909 except that the aperture is opened before image capturing is performed. As described above, if the aperture value is set to a large value, the depth of field is deep, and it may not be possible to appropriately acquire the amount of defocus, and for this reason, the processing of opening the aperture is performed if the aperture value is greater than or equal to the threshold value. Note that the accuracy of focusing is improved more as the aperture is opened wider (in other words, as the aperture value is set to a smaller value), but a certain level of effect can be expected even if the aperture is slightly opened. For this reason, there is no particular limitation on the degree of opening of the aperture in step S910.

After step S909 or step S910, the system control unit 50 advances the processing to step S905. The processing of step S905 is the same as that in the case of the image capturing sequence A, but the image A and the image B acquired at the time of capturing the live display still image are used to calculate the amount of defocus. After that, the system control unit 50 alternately captures recording still images and live display still images until completion of the continuous image capturing Next, the image capturing sequence selection processing performed in step S902 shown in FIG. 9 will be described in detail with reference to FIG. 10. In step S1001, the system control unit 50 determines whether or not the sensitivity for capturing a recording still image is greater than or equal to a threshold value. If it is determined that the sensitivity is greater than or equal to the threshold value (high sensitivity), the system control unit 50 advances the processing to step S1005, and selects the image capturing sequence B. If it is determined that the sensitivity is less than the threshold value (low sensitivity), the system control unit 50 advances the processing to step S1002, and determines whether or not the aperture value is greater than or equal to a threshold value. If it is determined that the aperture value is greater than or equal to the threshold value (close side), the system control unit 50 advances the processing to step S1005, and selects the image capturing sequence B. If it is determined that the aperture value is less than the threshold value (open side), the system control unit 50 advances the processing to step S1003, performs detection of a subject motion, and determines whether or not the speed of the subject is greater than or equal to a threshold value. In the detection of a subject motion, for example, the system control unit 50 can acquire an amount of change in the position of the center of gravity of a primary subject region between frames based on the signal data output from the image capturing unit 22 and detect a change in the state of the subject from the acquired amount of change. An algorithm that determines whether or not a primary subject is present within a screen based on luminance or color area distribution, edge information, and the like within the screen is generally known for detecting a primary subject. If the speed of the subject is greater than or equal to a threshold value (high speed), the system control unit 50 advances the processing to step S1005, and selects the image capturing sequence B. If the speed of the subject is less than the threshold value (low speed), the system control unit 50 advances the processing to step S1004, and selects the image capturing sequence A.

Figures 10, 11:
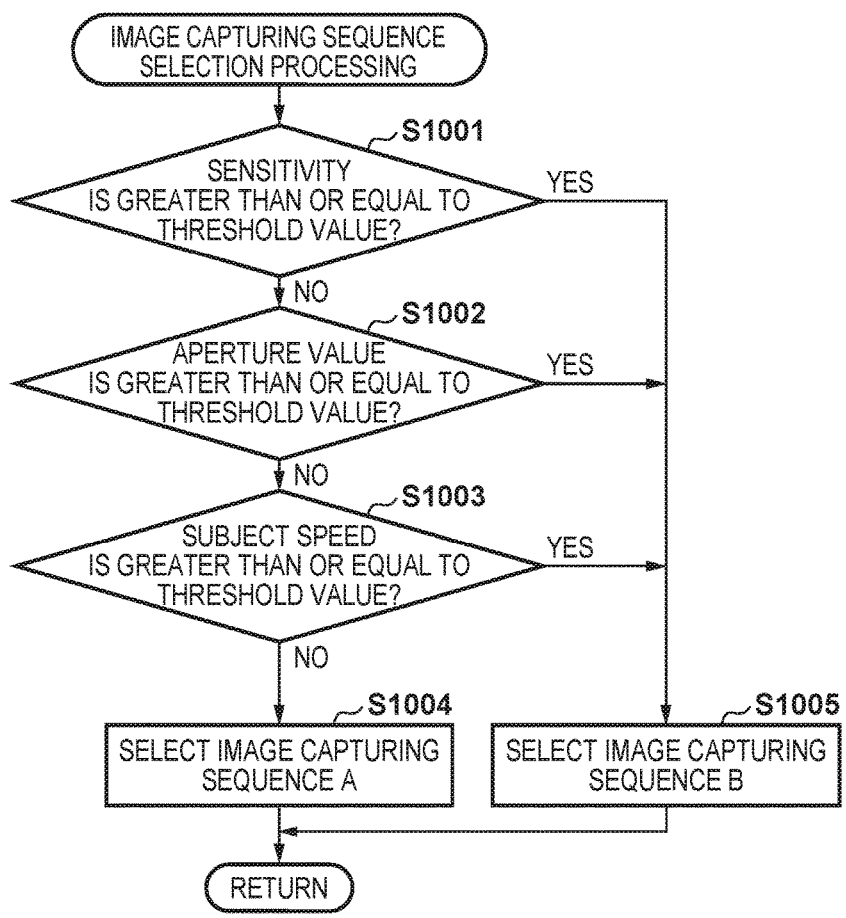
FIG. 10 is a flowchart showing in detail image capturing sequence selection processing performed in step S902 shown in FIG. 9.
FIG. 11 is a diagram showing an example of selecting an image capturing sequence based on sensitivity.

Although in step S1001 shown in FIG. 10, the sensitivity for capturing a recording still image is used as an example of the image capturing conditions that have an influence on noise, but the present embodiment is not limited thereto. Other examples of the image capturing conditions include whether or not to execute black subtraction processing, the temperature, the exposure time and the like for capturing a recording still image. The image capturing apparatus 100 selects the image capturing sequence A when an expected noise level based on one or any combination of these image capturing conditions is low (first level), and selects the image capturing sequence B when the expected noise level is high (second level).

Also, in general, the image quality level required for a live display still image is lower than that for a recording still image. However, depending on the noise level, the noise level difference in the live display still image displayed in real time during continuous image capturing becomes significant, and the user may strongly feel the deterioration of image quality. To address this, the image capturing apparatus 100 may further divide the expected noise level corresponding to the image capturing sequence B into two stages, and change the method for capturing a live display still image in step S909 and step S910 according to the expected noise level. In this case, the image capturing apparatus 100 selects the image capturing sequence A when the expected noise level is low (first level), and selects the image capturing sequence B when the expected noise level is moderate (second level) or high (third level). In capturing a live display still image based on the image capturing sequence B (step S909 or step S910), the image capturing apparatus 100 uses the X/Y scheme if the expected noise level is moderate (second level), and uses the Y scheme if the expected noise level is high (third level). Hereinafter, a specific example will be given with reference to FIGS. 11 to 13.

In FIGS. 11 to 13, "A" represents the image capturing sequence A, and "B1" represents the image capturing sequence B in which a live display still image is captured based on the X/Y scheme (hereinafter also referred to as "the image capturing sequence B1"). Likewise, "B2" represents the image capturing sequence B in which a live display still image is captured based on the Y scheme (hereinafter also referred to as "the image capturing sequence B2").

FIG. 11 is a diagram showing an example of selecting an image capturing sequence based on sensitivity. In the example shown in FIG. 11, the image capturing sequence A is selected if the sensitivity is less than or equal to ISO 400. Then, in ISO 800 in which the noise level difference in the recording still image is noticeable, the image capturing sequence is switched from the image capturing sequence A to the image capturing sequence B1. Furthermore, in ISO 3200 in which the noise level difference in the live display still image is noticeable, the image capturing sequence is switched from the image capturing sequence B1 to the image capturing sequence B2.

FIG. 12 is a diagram showing an example of selecting an image capturing sequence based on whether or not to execute black subtraction processing, sensitivity and temperature. The black subtraction processing is processing for the purpose of correction of defective pixels and removal of shading. It is known that when the black subtraction processing is performed, the captured image has a large noise. In the example shown in FIG. 12, it is determined whether or not the black subtraction processing is to be executed according to the sensitivity and the temperature. In the case of image capturing conditions corresponding to the blank cells, the black subtraction processing is not executed. In this case, for example, the image capturing sequence is selected in accordance with FIG. 11. In the case of image capturing conditions corresponding to the cells with "A", "B1" and "B2", the black subtraction processing is executed. In this case, in ISO 400 in which the noise level difference in the recording still image is noticeable, the image capturing sequence is switched from the image capturing sequence A to the image capturing sequence B1. Furthermore, in ISO 1600 in which the noise level difference in the live display still image is noticeable, the image capturing sequence is switched from the image capturing sequence B1 to the image capturing sequence B2. A comparison between FIG. 11 and FIG. 12 shows that when the black subtraction processing is performed, switching of the image capturing sequence is performed at a lower sensitivity. This is because if the sensitivity is the same, the expected noise level is higher when the black subtraction processing is performed than when the black subtraction processing is not performed.

FIG. 13 is a diagram showing an example of selecting an image capturing sequence based on exposure time and temperature. The noise tends to be larger as the exposure time is longer and the temperature is higher. For this reason, in the example shown in FIG. 13, the image capturing sequence is switched in the following order as the exposure time is longer and the temperature is higher: the image capturing sequence A→the image capturing sequence B1→the image capturing sequence B2.

As described above, according to the first embodiment, upon selection of the image capturing sequence B at the time of continuous image capturing, the image capturing apparatus 100 alternately captures a recording still image and a focus detection still image having a smaller number of pixels than the recording still image. Then, the image capturing apparatus 100 captures the recording still images based on the X scheme, and captures the focus detection still images based on the X/Y scheme or the Y scheme. With this configuration, it is possible to suppress deterioration of image quality of the recording still images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079735, filed Apr. 12, 2016, which is hereby incorporated by reference herein in its entirety.

What is claimed is:

1. An image capturing apparatus comprising:
an image sensor including a plurality of pixels, each pixel including a plurality of photoelectric conversion units that generate focus detection signals from light flux that have passed through different regions in an exit pupil in an optical system; and
an image capturing unit configured to continuously capture a plurality of images by using the image sensor, the image capturing unit being configured to acquire a signal in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal,
wherein the image capturing unit is configured to alternately capture a recording image and a focus detection image having a smaller number of pixels than the recording image, apply all pixels to the first acquisition mode when capturing the recording image, and apply at least a part of the pixels to the second acquisition mode when capturing the focus detection image.

2. The image capturing apparatus according to claim 1, further comprising a selecting unit configured to select a first continuous image capturing mode or a second continuous image capturing mode based on a predetermined condition,
wherein the image capturing unit is configured to, if the first continuous image capturing mode is selected, continuously capture the recording image and apply at least a part of the pixels to the second acquisition mode when capturing the recording image, and
the image capturing unit is configured to, if the second continuous image capturing mode is selected, alternately capture the recording image and the focus detection image, apply all pixels to the first acquisition mode when capturing the recording image, and apply at least a part of the pixels to the second acquisition mode when capturing the focus detection image.

3. The image capturing apparatus according to claim 2, wherein the selecting unit is configured to select the first continuous image capturing mode if an expected noise level based on an image capturing condition is a first level, and select the second continuous image capturing mode if the expected noise level is a second level that is higher than the first level.

4. The image capturing apparatus according to claim 3, wherein the image capturing condition includes at least one of sensitivity, whether or not to execute black subtraction processing, temperature, and exposure time for capturing the recording image.

5. The image capturing apparatus according to claim 2, wherein the selecting unit is configured to select the first continuous image capturing mode if an aperture value for capturing the recording image is less than a threshold value, and select the second continuous image capturing mode if the aperture value for capturing the recording image is greater than or equal to the threshold value, and
the image capturing unit is configured to, if the second continuous image capturing mode is selected, set an aperture value for capturing the focus detection image to be smaller than the aperture value for capturing the recording image.

6. The image capturing apparatus according to claim 2, further comprising a detection unit configured to detect a speed of a subject,
wherein the selecting unit is configured to select the first continuous image capturing mode if the speed of the subject is less than a threshold value, and select the second continuous image capturing mode if the speed of the subject is greater than or equal to the threshold value.

7. The image capturing apparatus according to claim 1, further comprising
a display unit configured to display the focus detection image in real time.

8. The image capturing apparatus according to claim 2, further comprising a display unit configured to display the focus detection image in real time, wherein the selecting unit is configured to select the first continuous image capturing mode if an expected noise level based on an image capturing condition is a first level, and select the second continuous image capturing mode if the expected noise level is a second level that is higher than the first level or a third level that is higher than the second level, and when capturing the focus detection image in the second continuous image capturing mode, the image capturing unit is configured to:
apply a part of the pixels to the second acquisition mode if the expected noise level is the second level; and
apply all pixels to the second acquisition mode if the expected noise level is the third level.

9. The image capturing apparatus according to claim 8, wherein the image capturing condition includes at least one of sensitivity, whether or not to execute black subtraction processing, temperature, and exposure time for capturing the recording image.

10. The image capturing apparatus according to claim 1, wherein an exposure time for the focus detection image is shorter than an exposure time for the recording image.

11. The image capturing apparatus according to claim 1, wherein the image capturing unit is configured to, if a part of the pixels is applied to the second acquisition mode when capturing the focus detection image, determine a position and a number of the part of the pixels each time image capturing is performed.

12. An image capturing apparatus comprising:
an image sensor configured to output an image signal for generating an image and a focus detection signal for performing focus detection; and
a controller configured to control a number of pixels used to output the image signal and the focus detection signal from the image sensor and a predetermined region for outputting the focus detection signal in the image sensor,
wherein the controller, when successively acquiring first frames for recording from the image sensor, controls the number of pixels used to output the image signal and the focus detection signal from the image sensor in a second frame acquired between the successively acquired first frames, based on an image capturing condition, and
the controller performs control so as to not record the second frame acquired between the successively acquired first frames if the second frame has a smaller number of pixels than the successively acquired first frames.

13. The image capturing apparatus according to claim 12, wherein the control unit is configured to perform control so as to record the successively acquired first frames and the second frame acquired between the successively acquired first frames if the second frame has an equal number of pixels to the successively acquired first frames.

14. The image capturing apparatus according to claim 12, wherein the control unit is configured to perform control so as to not read the focus detection signal with respect to the successively acquired first frames if the second frame acquired between the successively acquired first frames has a smaller number of pixels than the successively acquired first frames.

15. An image capturing method for an image capturing apparatus comprising an image sensor including a plurality of pixels, each pixel including a plurality of photoelectric conversion units that generate focus detection signals from light flux that have passed through different regions in an exit pupil in an optical system, the method comprising:
continuously capturing a plurality of images by using the image sensor, wherein a signal is acquired in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal,
wherein a recording image and a focus detection image having a smaller number of pixels than the recording image are alternately captured, all pixels are applied to the first acquisition mode when capturing the recording image, and at least a part of the pixels are applied to the second acquisition mode when capturing the focus detection image.

16. An image capturing method for an image capturing apparatus comprising an image sensor configured to output an image signal for generating an image and a focus detection signal for performing focus detection, the method comprising:
controlling a number of pixels used to output the image signal and the focus detection signal from the image sensor and a predetermined region for outputting the focus detection signal in the image sensor,
wherein, when first frames are successively acquired from the image sensor, the number of pixels used to output the image signal and the focus detection signal from the image sensor in a second frame acquired between the successively acquired first frames is controlled based on an image capturing condition, and
the second frame acquired between the successively acquired first frames is not recorded if the second frame has a smaller number of pixels than the successively acquired first frames.

17. An image capturing apparatus comprising:
an image sensor including a plurality of pixels, each pixel including a plurality of photoelectric conversion units that generate focus detection signals from light flux that have passed through different regions in an exit pupil in an optical system; and
a processor and a memory which function as:
an image capturing unit configured to continuously capture a plurality of images by using the image sensor, the image capturing unit being configured to acquire a signal in a first acquisition mode or a second acquisition mode for each pixel, the first acquisition mode being a mode in which an image signal obtained by adding the focus detection signals of the plurality of photoelectric conversion units is acquired, and the second acquisition mode being a mode in which the focus detection signals are acquired in addition to the image signal,
wherein the image capturing unit is configured to alternately capture a recording image and a focus detection image having a smaller number of pixels than the recording image, apply all pixels to the first acquisition mode when capturing the recording image, and apply at least a part of the pixels to the second acquisition mode when capturing the focus detection image.

18. The image capturing apparatus according to claim 17, wherein the processor and the memory further function as:
a selecting unit configured to select a first continuous image capturing mode or a second continuous image capturing mode based on a predetermined condition, wherein the image capturing unit is configured to, if the first continuous image capturing mode is selected, continuously capture the recording image and apply at least a part of the pixels to the second acquisition mode when capturing the recording image, and the image capturing unit is configured to, if the second continuous image capturing mode is selected, alternately capture the recording image and the focus detection image, apply all pixels to the first acquisition mode when capturing the recording image, and apply at least a part of the pixels to the second acquisition mode when capturing the focus detection image.

19. The image capturing apparatus according to claim 18, wherein the selecting unit is configured to select the first continuous image capturing mode if an expected noise level based on an image capturing condition is a first level, and select the second continuous image capturing mode if the expected noise level is a second level that is higher than the first level.

20. The image capturing apparatus according to claim 12, wherein the first frames are frames for recording still images, and the second frame is a frame for a live display still image.

21. The image capturing apparatus according to claim 12, wherein the controller performs control such that the second frame acquired between the successively acquired first frames has a smaller number of pixels than the successively acquired first frames, thereby reducing noise generated in the image sensor.

* * * * *